US012664052B1

(12) United States Patent
Joseph

(10) Patent No.: US 12,664,052 B1
(45) Date of Patent: Jun. 23, 2026

(54) INTELLIGENT STORAGE DEVICE TO EXECUTE A HINT SEARCH

(71) Applicant: Sandisk Technologies, Inc., Milpitas, CA (US)

(72) Inventor: Joji Joseph, Mountain View, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/072,007

(22) Filed: Mar. 6, 2025

(51) Int. Cl.
| | |
|---|---|
| *G06F 11/00* | (2006.01) |
| *G06F 11/10* | (2006.01) |
| *G06F 12/02* | (2006.01) |
| *G06F 16/22* | (2019.01) |
| *G06F 16/953* | (2019.01) |

(52) U.S. Cl.
CPC ...... *G06F 11/1096* (2013.01); *G06F 12/0223* (2013.01); *G06F 16/2255* (2019.01); *G06F 16/953* (2019.01)

(58) Field of Classification Search
CPC ............. G06F 11/1096; G06F 11/1076; G06F 11/3072
See application file for complete search history.

(56) References Cited

U.S. PATENT DOCUMENTS

| | | | |
|---|---|---|---|
| 8,634,248 | B1 | 1/2014 | Sprouse |
| 9,392,005 | B2 | 7/2016 | Yoo |
| 10,592,162 | B2 | 3/2020 | Peterson |
| 11,249,664 | B2 | 2/2022 | Hahn |
| 11,249,999 | B2 | 2/2022 | Colgrove |
| 2022/0342542 | A1* | 10/2022 | Alkalay .............. G06F 12/0238 |

* cited by examiner

*Primary Examiner* — Katherine Lin
(74) *Attorney, Agent, or Firm* — Arlene Neal; NEAL BLIBO LLC

(57) ABSTRACT

A storage device enables a host to search for data stored across channels on a memory device without reading the user data stored on the channels. The storage device includes a memory device including user channels to store user data and a hash channel to store hash data associated with the user data. The hash data is used to identify the user data. A controller on the storage device generates the hash data including hint data during storage of user data on the user channels. The controller receives a hint from the host, generates a request and submits the request to a pattern search engine. The controller sends a hint response including flash translation indices to the host, based on a response from the pattern search engine. The host may read the flash translation indices to request data stored at a specific location in the user channels.

20 Claims, 7 Drawing Sheets

_110

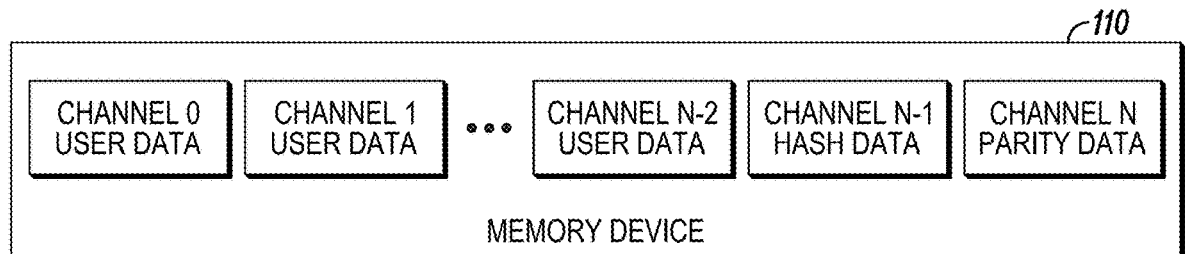

| CHANNEL 0 USER DATA | CHANNEL 1 USER DATA | ••• | CHANNEL N-2 USER DATA | CHANNEL N-1 HASH DATA | CHANNEL N PARITY DATA |
|---|---|---|---|---|---|

MEMORY DEVICE

| CHANNEL 0 | CHANNEL 1 | | CHANNEL N-2 | CHANNEL N-1 | CHANNEL N |
|---|---|---|---|---|---|
| 4K CH0 LOGICAL PAGE 0 | 4K CH1 LOGICAL PAGE 0 | | 4K CH N-2 LOGICAL PAGE 0 | 128B LP0-CH0 H<br>128B LP0-CH1 H<br>...<br>128B LP0-CH N-2 H<br>128B LP0-CH N-1 M<br>128B LP0-CH N M | 4K LP0 PARITY DATA FOR CH0 TO CH N-1 |
| 4K CH0 LOGICAL PAGE 1 | 4K CH1 LOGICAL PAGE 1 | | 4K CH N-2 LOGICAL PAGE 1 | 128B LP1-CH0 H<br>128B LP1-CH1 H<br>...<br>128B LP1-CH N-2 H<br>128B LP1-CH N-1 M<br>128B LP1-CH N M | 4K LP1 PARITY DATA FOR CH0 TO CH N-1 |
| 4K CH0 LOGICAL PAGE 2 | 4K CH1 LOGICAL PAGE 2 | ••• | 4K CH N-2 LOGICAL PAGE 2 | 128B LP2-CH0 H<br>128B LP2-CH1 H<br>...<br>128B LP2-CH N-2 H<br>128B LP2-CH N-1 M<br>128B LP2-CH N M | 4K LP2 PARITY DATA FOR CH0 TO CH N-1 |
| 4K CH0 LOGICAL PAGE L | 4K CH1 LOGICAL PAGE L | | 4K CH N-2 LOGICAL PAGE L | 128B LP2LCH0 H<br>128B LPL-CH1 H<br>...<br>128B LPL-CH N-2 H<br>128B LPL-CH N-1 M<br>128B LPL-CH N M | 4K LP-L PARITY DATA FOR CH0 TO CH N-1 |

MEMORY DEVICE

*FIG. 3*

INTELLIGENT STORAGE DEVICE TO EXECUTE A HINT SEARCH

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in pages on blocks on the memory device. Data stored in blocks on the memory device may be assigned a logical block address (LBA) that provides a unique identifier to the individual block, called flash translation index (FTI). The LBAs may be mapped one-to-one to physical addresses on the memory device and a controller on the storage device may manage the mapping of LBAs to physical locations within the memory device. When the host wants to read data from the memory device, the host may send the LBA(s) associated with the data to the storage device and based on the logical-to-physical mappings, the controller may retrieve the data from the memory device.

In a conventional storage device, when an application on the host wants to find a pattern in data stored on the memory device, the host may read all the user data to find whether or not a specific pattern exists in the data. Consider an example where the storage device has a 64 terabyte (TB) capacity. If, for example, a surveillance application is running on the host and the surveillance application is storing surveillance videos on the memory device, when the surveillance application captures a face, it may have to identify, in real time, how many times the face has been captured based on the stored surveillance videos. The host application may thus have to search the entire contents on the memory device to find the face in the data stored on the memory device. The reading of all the user data may cause read-disturbance and other read issues on the memory cells.

A fundamental feature of any artificial intelligence (AI) system is its ability to perform pattern searching on vast amounts of data and make decisions based on matches. For example, a robot may perform facial recognition on vast amounts of data in a second if it has the ability to perform pattern searching and quickly find a match. As such, a convention storage device, where an application running on the host has to read vast amounts of data stored on the memory device to perform pattern searching, may not be efficiently used in machine learning and other AI systems.

SUMMARY OF THE INVENTION

In some implementations, a storage device may enable a host to search for data stored across channels on a memory device without reading the user data stored on the channels. The storage device may include a memory device including user channels to store user data and a hash channel to store hash data associated with the user data. The hash data may be used to identify user data. A controller on the storage device may generate the hash data including hint data during storage of user data on the user channels. The controller may receive a hint from the host, generate a request, and submit the request to a pattern search engine. The controller may send a hint response including flash translation indices to the host, based on a response from the pattern search engine. The host may read the flash translation indices to request data stored at a specific location in the user channels.

In some implementations, a method is provided on the storage device for enabling a host to search for data stored across channels on a memory device without reading user data stored on the channels. The method includes generating hash data including hint data during storage of user data on user channels. The method also includes receiving a hint from the host, generating a request, and submitting the request to a pattern search engine. The method further includes sending a hint response including flash translation indices to the host, based on a response from the pattern search engine. The host may read the flash translation indices to request data stored at a specific location in the user channels.

In some implementations, a method is provided on the storage device for generating hash data associated with user data stored on user channels to enable a host to search for data stored across channels on a memory device without reading user data stored on the channels. The method includes receiving data sent from the host to be saved on the user channels on the memory device. The method also includes triggering a parity generator to generate parity information for the user data and triggering a hash generator to generate hash data for the user data. The method further includes storing the user data on the user channels, the parity data on the parity channel, and the hash data on a hash channel. The method also includes receiving a hint from the host, searching the hash channel for the hash data that matches the hint, and sending a hint response including flash translation indices to the host. The host may read the flash translation indices to request data stored at a specific location in the user channels.

BRIEF DESCRIPTION OF THE DRAWINGS

FIG. 2 is a schematic block diagram of an example RAID-N stripe format used in accordance with some implementations.

FIG. 3 is a further schematic block diagram of an example RAID-N stripe format with hash and parity data in accordance with some implementations.

Figure 1:
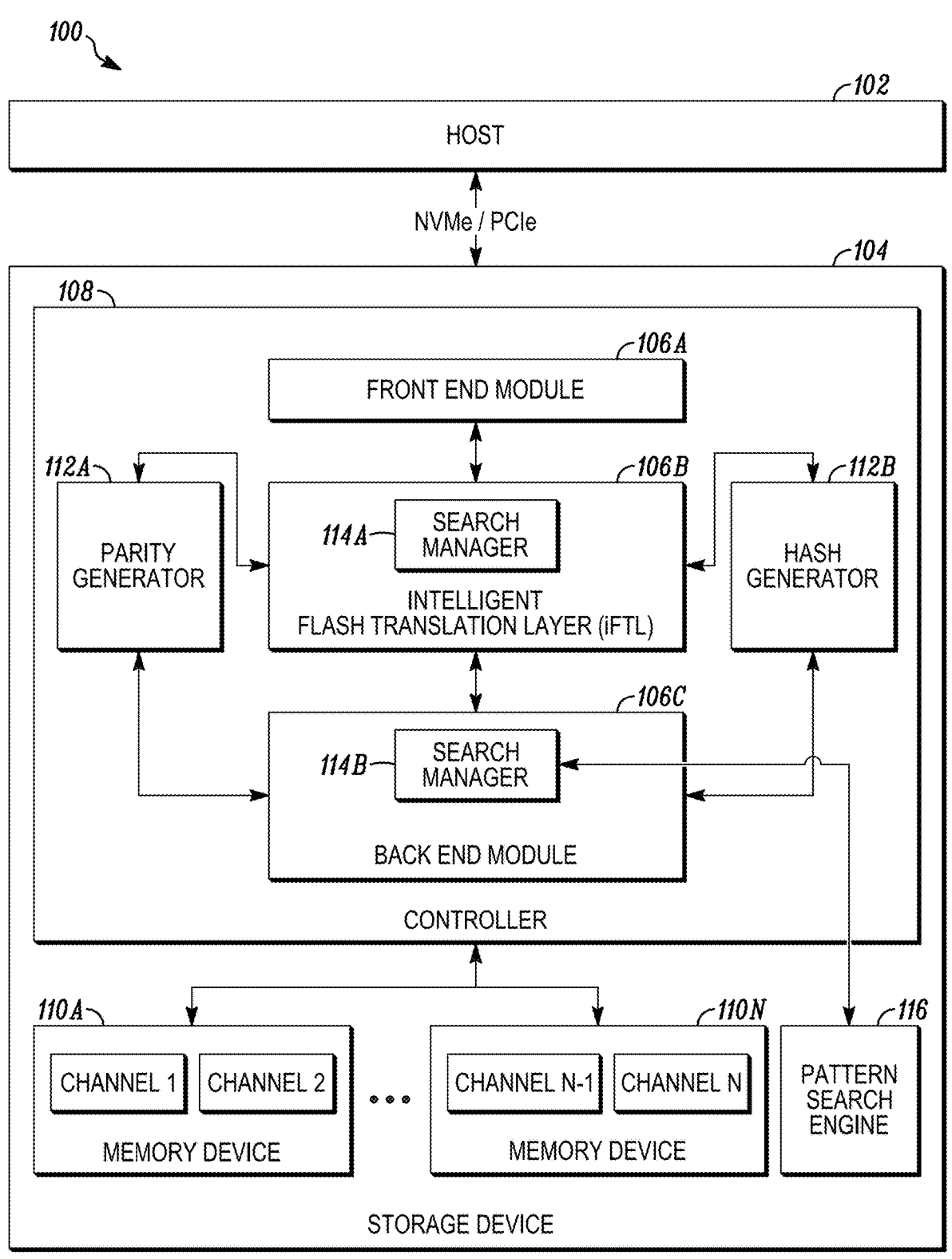
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104. Host 102 and storage device 104 may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage devices 104 may be, for example, a solid-state drive (SSD) that may include a controller 108 and one or more storage components such as non-volatile memory devices 110a-110n (referred to herein as the memory device(s) 110). Controller 108 may interface with host 102 and process foreground operations including instructions transmitted from host 102. For example, controllers 108 may read data from and/or write to memory devices 110 based on instructions received from host 102. Controller 108 may also execute background operations to manage resources on memory device 110. For example, controller 108 may monitor memory devices 110 and may execute garbage collection and other relocation functions per internal relocation algorithms to refresh, recycle, and/or relocate the data on memory devices 110.

Memory device 110 may be flash based. For example, memory device 110 may be a NAND or NOR flash memory that may be used for storing host and control data over the operational life of memory devices 110. Memory device 110 may include one or more dies/channels (shown as N channels) connected to a memory bus including data lines and chip enable lines. The channels may be divided into blocks and data may be stored in the blocks in various formats, with the formats being defined by the number of bits that may be stored per memory cell.

Memory device may support a redundant array of independent disks (RAID) N (RAID-N) stripe format wherein, wherein data may be stripped across multiple channels and user data may be stored on N–2 channels (referred to herein as user channels). One channel in the stripe (referred to herein as a parity channel) may be dedicated to storing parity information that may be used for error correction and one channel in the stripe (referred to herein as a hash channel) may be dedicated to storing hash information. The hash information may be a collection of one or more hints (representations) associated with the user data and the hash information may be used to identify user data. Memory device 110 may be included in storage device 104 or may be otherwise communicatively coupled to storage device 104.

Controller 108 may include a front-end module 106a, an intelligent flash translation layer (iFTL) 106b, and a back-end module 106c. Front-end module 106a may support features provided on a conventional storage device 104 such as NVME interfacing, link management, etc. Front-end module 106a may also support a vendor unique command (VUC) that may be provided over, for example, the NVME protocol, wherein host 102 may use the VUC to provide a hint to storage device 104. iFTL 106b may support FTL features provided on a conventional storage device 104 such as name spaces, logical-to-physical (L2P) mapping, parity, flash translation index (FTI) management, etc. iFTL 106b also may support the RAID-N stripe format including N–2 user channels, a hash channel, and a parity channel. Back-end module 106c may interface with memory device 110 and also support the RAID-N stripe format including N–2 user channels, a hash channel, and a parity channel.

Controller 108 may also include a parity generator 112a and a hash generator 112b. Parity generator 112a may generate parity information for error correction on user data and the parity information may be stored on the parity channel. Hash generator 112b may be a transceiver that may receive input of any pre-defined size of data and create a unique hash value for a logical page of data. A hash data size may correspond with a logical page or FTI. For example, for a thirty-two-channel stripe with a 4K logical page format, the hash data per channel may be 4K divided by thirty-two, i.e., 128 bytes. For an 8K logical page, the hash data per channel may be 8K divided by thirty-two, i.e., 256 bytes. For a 16K logical page, the hash data per channel may be 16K divided by thirty-two, i.e., 512 bytes. The hash data format and the meta data format in the hash channel may be implementation specific. For example, hash generator 112b may generate hash to support video search or other kinds of data structure searches. The hash may include hint data for all channels in a stripe. Hash generator 112b may thus be used to generate a short unique identifier for a long string of data so that hash can be quickly searched. Hash generator 112b may use a lookup table to generate the hash data.

Front-end module 106a may interface with host 102 and may receive data sent from host 102 to be saved on memory device 110. The data may be stored on memory device 110 in units of, for example, 4 Kilobytes (K). When host 102 sends data to be written to memory device 110, front-end module 106a may forward the data to iFTL 106b which may forward the data to back-end module 106c. In forwarding the data to back-end module 106c, iFTL 106b may trigger parity generator 112a to generate parity information for the data. The parity data may be written to the parity channel. iFTL 106b may also trigger hash generator 112b to create the hash data (i.e., a representation) for each logical page when a stripe is written. The hash data may be written to the hash channel. Parity generator 112a and hash generator 112b may forward the parity information and hash to back-end module 106c. Back-end module 106c may interface with memory device 110 and store user data to the user channels, parity information to the parity channel, and hash information to the hash channel.

Host 102 may also generate hints that may correspond to the hash data stored on the hash channel. Host 102 may retrieve information associated with one or more hints from storage device 104 by sending a VUC with one or more hints to front-end module 106a. A hint may be a unique hash word associated with a data unit. The hint may be a single sequence of bytes or a data structure with multiple information. The hint may be a parity polynomial data as a whole or a data structure that may be used with additional hints for further accuracy during a search. Front-end module 106 may send a descriptor for the hint to iFTL 106b.

When iFTL 106b receives the hint/descriptor from front-end module 106, iFTL 106b may invoke FTL search manager 114a (also referred to herein as a first search manager) to perform a full or partial search for the hint across all channels. FTL search manager 114a may create a per channel hint search request and may submit the hint search request to back-end (BE) search manager 114b (also referred to herein as a second search manager) on back-end module 106c. BE search manager 114b may be a hardware assisted module that may assist in finding a match in a data buffer. BE search manager 114b may read the hash data for channels in a specific memory space (for example, the hash channel). The hash data read request may be executed for all user channels and BE search manager 114b may receive the completed response. BE search manager 114b may formulate a chained request with linked list buffers and submit the request to a pattern search engine 116.

Pattern search engine 116 may be part of a hardware data path, as a transceiver, in which a search may be performed in real time. A data-path controller hardware engine may manage the process on the hardware data path. This may free controller 108 from manually handling all the hash search requests/responses. Once invoked, pattern search engine 116 may search the hash channel for hash information associated with the hint.

When pattern search engine 116 retrieves the hash information that matches the hint from the hash channel, pattern search engine 116 may return a match list including the hash data that matches the hint to back-end module 106c. Back-end module 106c may prepare a list of the locations on the user channels that are associated with the matches in the match list and return a response to iFTL 106b. iFTL 106b may notify front-end module 106a, which in turn may send a hint response with FTI list(s) to host 102. Thereafter, host 102 may read the FTIs returned from storage device 104 to request data at a specific location in the user channel.

Consider an example where host 102 wants to retrieve data associated with a pattern. Host 102 may generate a hint associated with the pattern and send the hint via VUC to storage device 104. When invoked, pattern search engine 116 may search the hash channel for hash information associated with the hint and storage device 104 may return a FTI list to host 102. Thereafter, host 102 may use the information in the FTI list to identify a specific location in memory device 110 where data associated with the pattern is stored. Host 102 may then issue a read request to storage device 104 to retrieve the data from the specific location in memory device 110, without having to search the entire contents of memory device 110 for the data.

Storage device 104 may be used, for example, as a face recognition search engine or an information search engine. Consider an example where a large number of pictures with other details are stored on memory device 110 and storage device 104 may generate face patterns as hash data. When host 102 wants to identify a face in a photo, host 102 may create a hash/hint (for example, a face pattern) out of the photo and send a VUC with the hint to storage device. Storage device 104 may return a FTI list that matches the hint after searching the hash channel. Thereafter, host 102 may read the FTIs to identify location(s) on memory device 110 where the face pattern in the photo is stored. Host 102 may directly request an image, including the face pattern that is stored at a given location in memory device 110, from storage device 104, without having to read the entire contents of storage device 104 to find the image.

In another example, information files may be saved on memory device 110 with FTIs and storage device 104 may save tags as hash data. Host 102 may issue a hint search with one or more tags. Storage device 104 may return a FTI list that matches the hint. Host 102 may thereafter read the FTIs to identify location(s) on memory device 110 where files associated with the tags in the hint are stored. Host 102 may directly request the specific file(s) from storage device 104, without having to read the entire contents of storage device 104 to find the specific files.

Storage device 104 may therefore provide the ability for host applications to perform quick searches on large amount of data that are stored across the channels on memory device 110. The searching capabilities provided by storage device 104 may be useful for applications requiring searches on like databases, information, object storages etc. and may boost the ability of artificial-intelligent applications that require faster searching ability. In addition to enabling quick searches on large amount of data that are stored across the channels on memory device 110, storage device 104 may also perform the functions of a conventional storage device.

Storage device 104 may perform these processes based on one or more processors, for example, controller 108 (or the components such as front-end module 106a, iFTL 106b, back end module 106c, parity generator 112a, hash generator 112b, search manager 114a and/or search manager 112b) executing software instructions stored by a non-transitory computer-readable medium, such as storage component/ memory device 110. As used herein, the term "computer-readable medium" refers to a non-transitory memory device. Software instructions may be read into storage component 110 from another computer-readable medium or from another device. When executed, software instructions stored in storage component 110 may cause one or more processor, for example, controller 108 (and/or the components therein), to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIG. 2 is a schematic block diagram of an example RAID-N stripe format used in accordance with some implementations. Channels N−2 may be used to store user data. Channel N−1 may be dedicated to saving hash data which may be a collection of one or more hints associated with user data. Channel N−1 may store the hash data for each logical page when a stripe is written. Channel N may be dedicated to storing parity data for all channels that include user data and hash data. FIG. 2 is provided as an example. Other examples may differ from what is described in FIG. 2.

FIG. 3 is a further schematic block diagram of an example RAID-N stripe format with hash and parity data in accordance with some implementations. The stripe size may be for any standard logical page format, for example, 4K, 512, etc. The example shown in FIG. 3 shows 4K logical page (LP) (i.e., logical page 0-logical page L) data across all user channels (i.e., channels (CH) 0-CH N−2). The hash channel (i.e., channel N−1) may include 128-byte hash (H) per channel. The hash channel may also use 256-byte hash meta-data (M) that is associated with the hash channel and the parity channel. The meta data space may have different applications. For example, the meta data could be used for storing a super signature which may be used to improvise a pattern searching algorithm parity data. The parity channel (i.e., channel N) may include a 4K logical page parity for the logical pages in the user channels and hash channel. FIG. 3 is provided as an example. Other examples may differ from what is described in FIG. 3.

Figure 4:
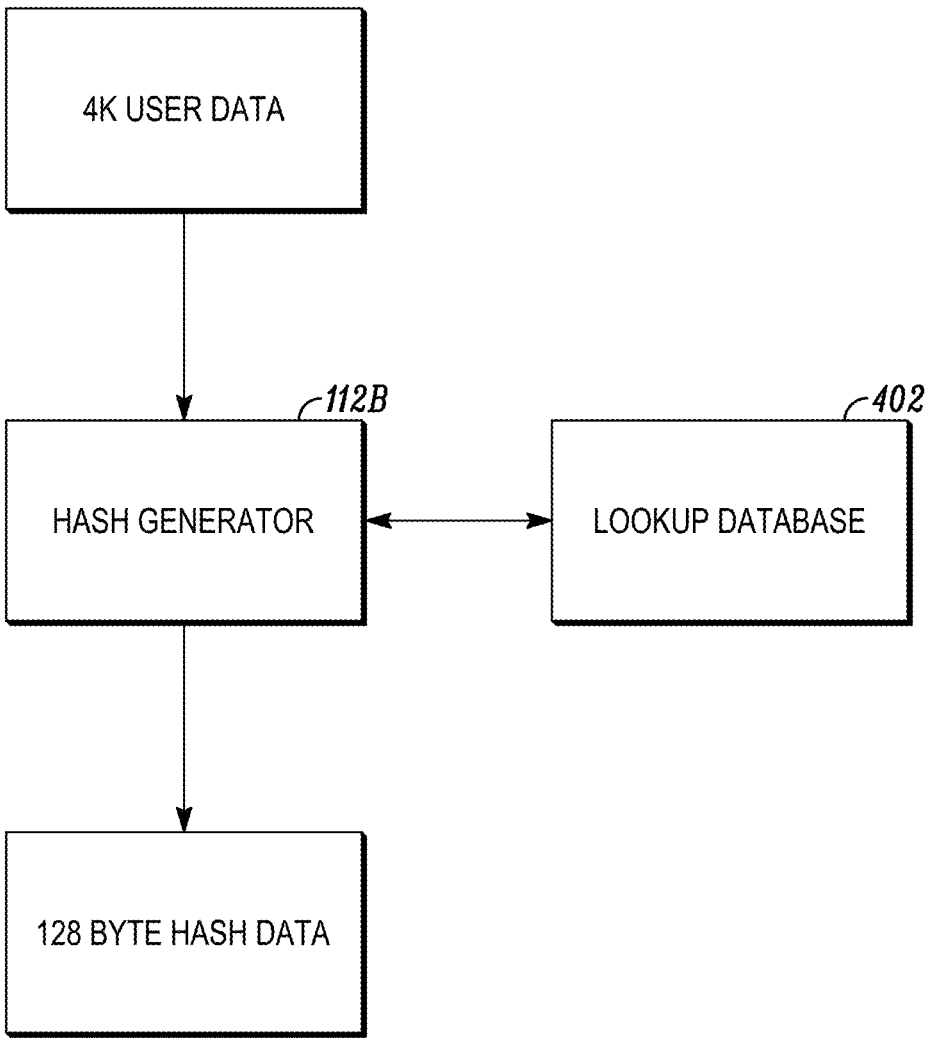
FIG. 4 is a schematic block diagram of a hash generator used in accordance with some implementations.

FIG. 4 is a schematic block diagram of a hash generator used in accordance with some implementations. Hash generator 112b may be a transceiver that may receive input of any pre-defined size of data. For example, hash generator 112b may receive 4K user data as input. Hash generator 112b may create a unique hash value for a logical page of data, shown, for example, as 128-byte hash data. Hash generator 112b may use a lookup database 402 to generate the hash data. The supported input and output size and registers configured for hash generator 112b may vary based on an application-specific integrated circuit implementation. Hash generator 112b may support a standard hash algorithm like MD-5 or SHA to create a hash key from the user data or a custom polynomial, with the condition that the generated hash is unique and represents the whole source data.

Hash generator 112b may generate partial hash data from a partial data source. The partial hash data may be included in full hash data. For example, assuming that hash generator 112b creates hash data 1234 from a full source data ABCD, hash generator 112b may generate partial hash data 1000 from partial data A000. The partial hash may be used in a partial search in which host 102 provides partial information.

The input (for example, the 4K user data input) into hash generator 112b may include data associated with multiple tags. The 128-byte hash data generated from data associated with multiple tags may be a combination of more than one hint. For example, if the 128-byte hash includes eight hints of 16 bytes each, hash generator 112b may use a search for one of these hints to find a match within the 128-byte hash data. The match may point to the actual data from an offset or index of the hint. FIG. 4 is provided as an example. Other examples may differ from what is described in FIG. 4.

Figure 5:
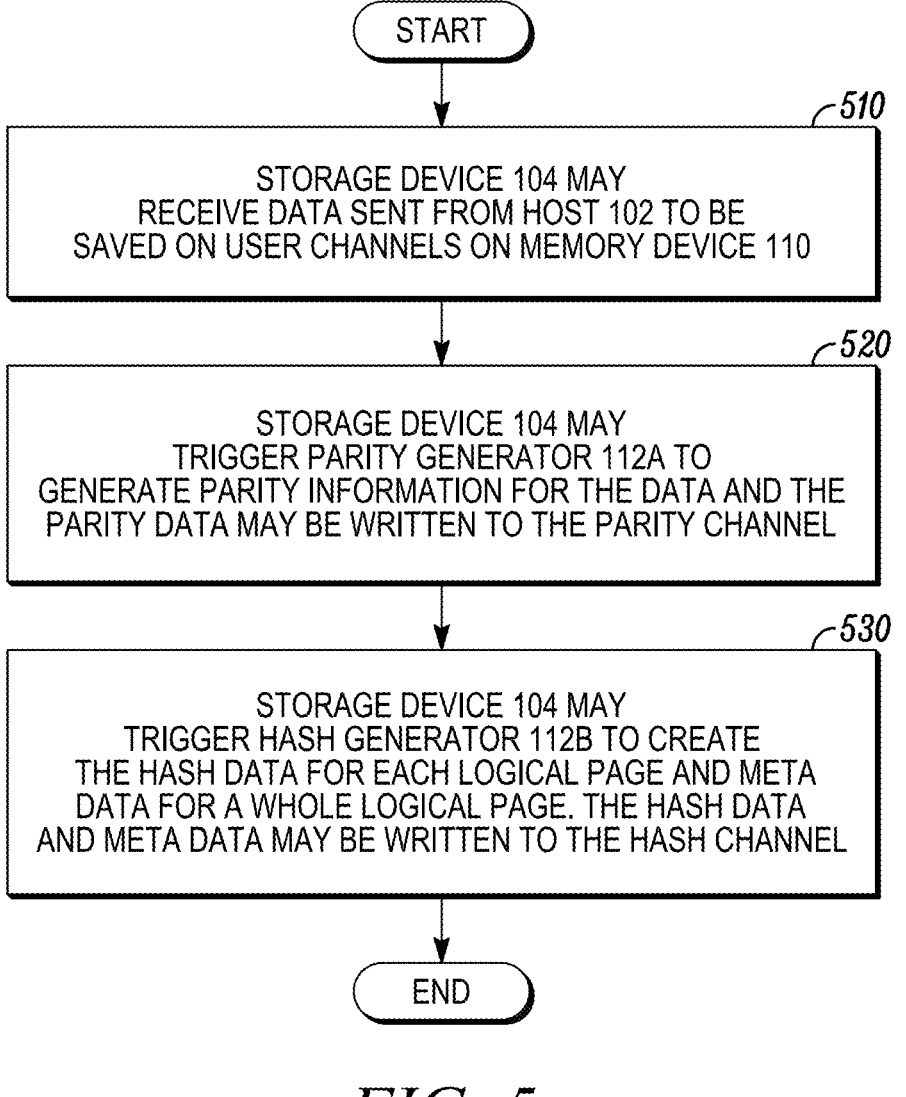
FIG. 5 is an example flow diagram for generating hash data associated with user data stored on user channels in accordance with some implementations.

FIG. 5 is an example flow diagram for generating hash data associated with user data stored on user channels in accordance with some implementations. At 510, storage device 104 may receive data sent from host 102 to be saved on user channels on memory device 110. At 520, storage device 104 may trigger parity generator 112a to generate parity information for the data and the parity data may be written to the parity channel. At 530, storage device 104 may trigger hash generator 112b to create the hash data for each logical page and meta data for a whole logical page, where the hash data and meta data may be written to the hash channel. FIG. 5 is provided as an example. Other examples may differ from what is described in FIG. 5.

Figure 6:
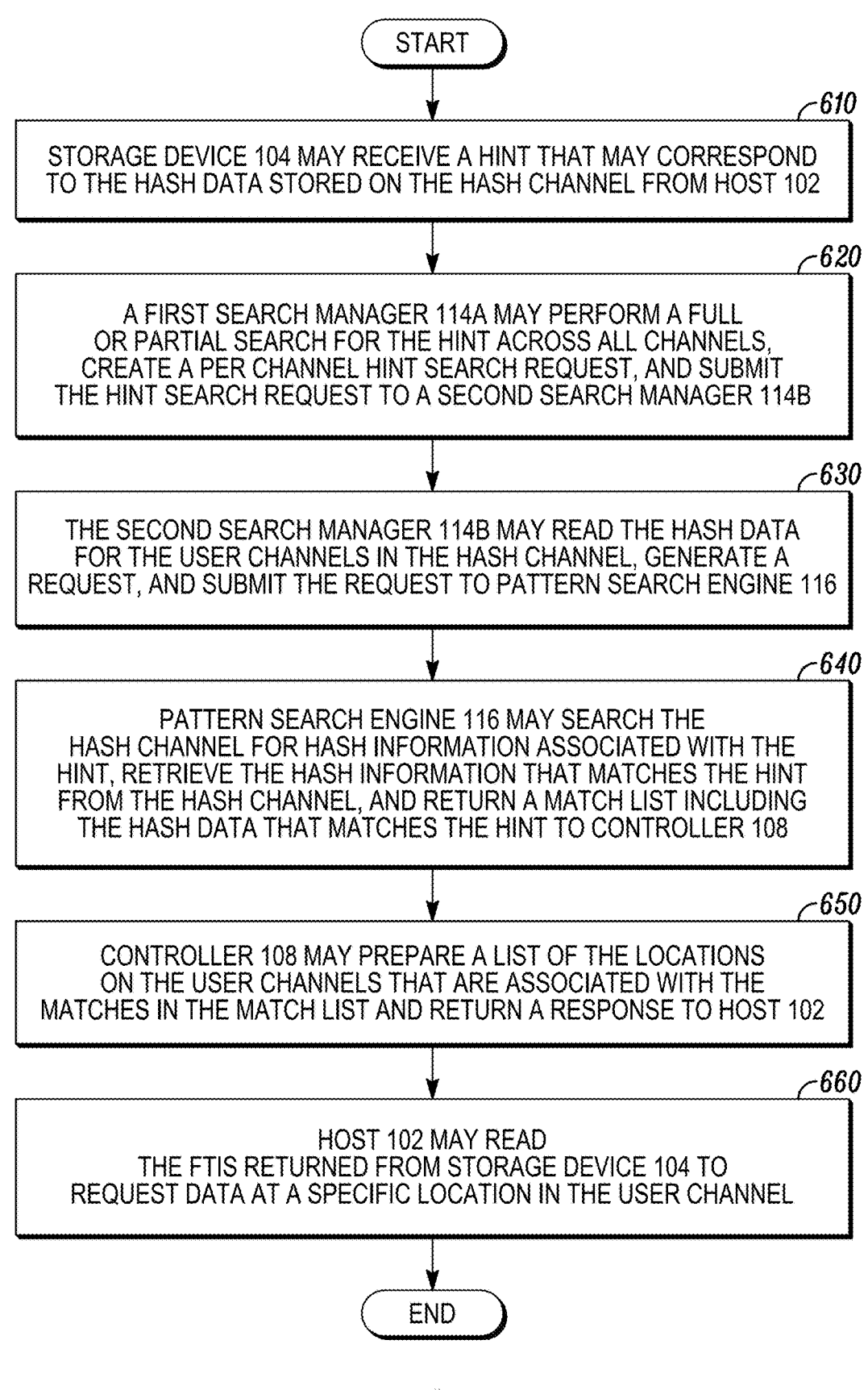
FIG. 6 is an example flow diagram for enabling a host to search for data stored across channels on a memory device without reading the user data on the channels in accordance with some implementations.

FIG. 6 is an example flow diagram for enabling a host to search for data stored across channels on a memory device without reading the user data on the channels in accordance with some implementations. At 610, storage device 104 may receive a hint that may correspond to the hash data stored on the hash channel from host 102. At 620, a first search manager 114a may perform a full or partial search for the hint across all channels, create a per channel hint search request, and submit the hint search request to a second search manager 114b. At 630, the second search manager 114b may read the hash data for the user channels in the hash channel, generate a request, and submit the request to pattern search engine 116.

At 640, pattern search engine 116 may search the hash channel for hash information associated with the hint, retrieve the hash information that matches the hint from the hash channel, and return a match list including the hash data that matches the hint to controller 108. At 650, controller 108 may prepare a list of the locations on the user channels that are associated with the matches in the match list and return a response to host 102. At 660, host 102 may read the FTIs returned from storage device 104 to request data at a specific location in the user channel. As indicated above FIG. 6 is provided as an example. Other examples may differ from what is described in FIG. 6.

Figure 7:
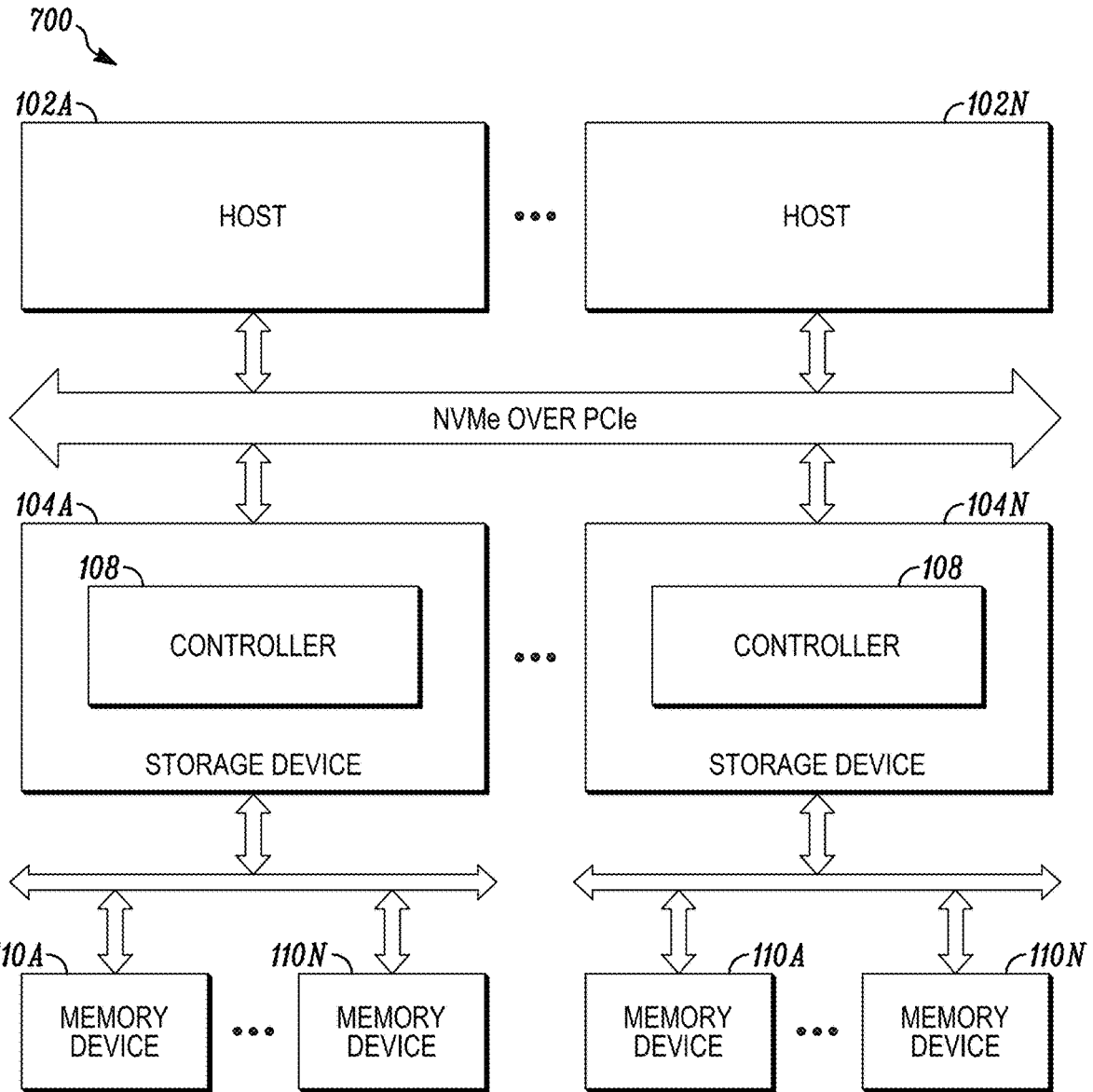
FIG. 7 is a diagram of an example environment in which systems and/or methods described herein are implemented.

FIG. 7 is a diagram of an example environment in which systems and/or methods described herein are implemented. As shown in FIG. 7, Environment 700 may include hosts 102-102n (referred to herein as host(s) 102), and one or more storage devices 104a-104n (referred to herein as storage device(s) 104). Storage device 104 may enable host 102 to search for data stored across channels on memory device 110, without reading the user data on the user channels on memory device 110. Hosts 102 and storage device 104 may communicate via Non-Volatile Memory Express (NVMe) over peripheral component interconnect express (PCI Express or PCIe), SD, or the like.

Devices of Environment 700 may interconnect via wired connections, wireless connections, or a combination of wired and wireless connections. For example, the network in FIG. 7 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of Environment 700 may perform one or more functions described as being performed by another set of devices of Environment 700.

Figure 8:
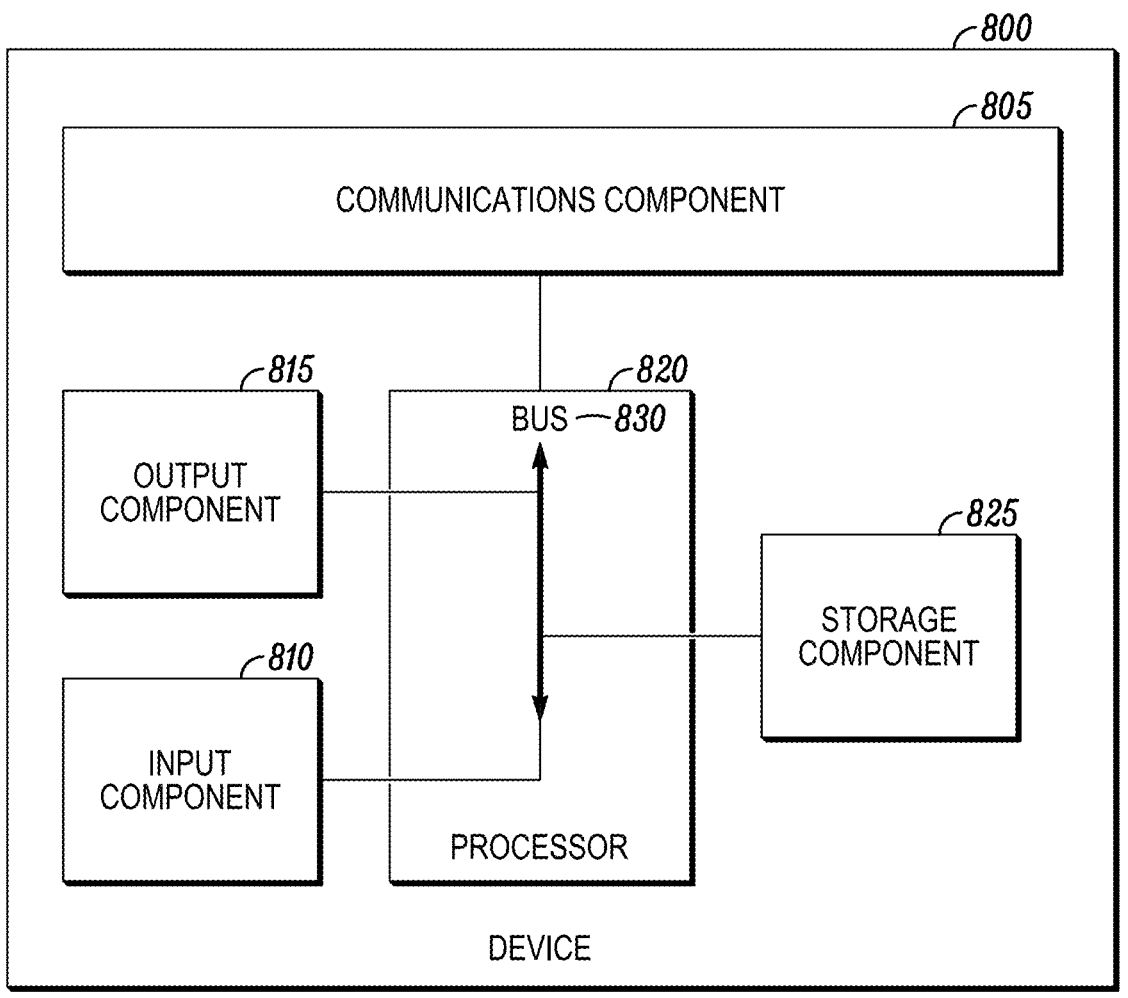
FIG. 8 is a diagram of example components of one or more devices of FIG. 1.

FIG. 8 is a diagram of example components of one or more devices of FIG. 1. In some implementations, host 102 may include one or more devices 800 and/or one or more components of device 800. Device 800 may include, for example, a communications component 805, an input component 810, an output component 815, a processor 820, a storage component 825, and a bus 830. Bus 830 may include components that enable communication among multiple components of device 800, wherein components of device 800 may be coupled to be in communication with other components of device 800 via bus 830.

Input component 810 may include components that permit device 800 to receive information via user input (e.g., keypad, a keyboard, a mouse, a pointing device, and a network/data connection port, or the like), and/or components that permit device 800 to determine the location or other sensor information (e.g., an accelerometer, a gyroscope, an actuator, another type of positional or environmental sensor). Output component 815 may include components that provide output information from device 800 (e.g., a speaker, display screen, and network/data connection port, or the like). Input component 810 and output component 815 may also be coupled to be in communication with processor 820.

Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 may include one or more processors capable of being programmed to perform a function. Processor 820 may be implemented in hardware, firmware, and/or a combination of hardware and software.

Storage component 825 may include one or more memory devices, such as random-access memory, read-only memory (ROM), and/or another type of dynamic or static storage device (e.g., a flash memory, a magnetic memory, and/or optical memory) that stores information and/or instructions for use by processor 820. A memory device may include memory space within a single physical storage device or memory space spread across multiple physical storage devices. Storage component 825 may also store information and/or software related to the operation and use of device 800. For example, storage component 825 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 805 may include a transceiver-like component that enables device 800 to communicate with other devices, such as via a wired connection, a wireless connection, or a combination of wired and wireless connections. The communications component 805 may permit device 800 to receive information from another device and/or provide information to another device. For example, communications component 805 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 805 may also include one or more broadband and/or narrowband transceivers and/or other similar types of wireless transceiver configurable to communicate via a wireless network for infrastructure communications. Communications component 805 may also include one or more local area network or personal area network transceivers, such as a Wi-Fi transceiver or a Bluetooth transceiver.

Device 800 may perform one or more processes described herein. For example, device 800 may perform these processes based on processor 820 executing software instructions stored by a non-transitory computer-readable medium, such as storage component 825. As used herein, the term "computer-readable medium" refers to a non-transitory memory device. Software instructions may be read into storage component 825 from another computer-readable medium or from another device via communications component 805. When executed, software instructions stored in storage component 825 may cause processor 820 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device to enable a host to search for data stored across channels on a memory device without reading user data stored on user channels, the storage device comprises:

the memory device includes the user channels to store user data and a hash channel to store hash data associated with the user data, wherein the hash data is used to identify user data; and a controller to generate the hash data including hint data during storage of the user data on the user channels in a stripe, receive a hint from the host, generate a request, submit the request to a pattern search engine, and send a hint response including flash translation indices to the host, based on a response from the pattern search engine, wherein the host reads the flash translation indices to request data stored at a specific location in the user channels.

2. The storage device of claim 1, wherein the controller further comprises a front-end module to interface with the host and receive a vendor unique command with the hint from the host.

3. The storage device of claim 1, wherein the controller further comprises a flash translation layer to support a RAID-N stripe format including N−2 user channels, the hash channel, and a parity channel and trigger a hash generator when the user data is stored on the user channels, wherein the hash generator generates the hash data.

4. The storage device of claim 3, wherein the flash translation layer includes a first search manager to perform one of a full search and a partial search for the hint across the user channels and the hash channel and the first search manager creates a per channel hint search request that is sent to a second search manager.

5. The storage device of claim 4, wherein the second search manager reads the hash data for the user channels in the hash channel, generates a request, and submits the request to the pattern search engine.

6. The storage device of claim 1, wherein the controller further comprises a back-end module to interface with the memory device and support a RAID-N stripe format including N−2 user channels, the hash channel, and a parity channel.

7. The storage device of claim 1, wherein the controller further comprises a parity generator to generate parity information for error correction on the user data, wherein the parity information is stored on a parity channel.

8. The storage device of claim 1, wherein the controller further comprises a hash generator to receive predefined sized data and to create a unique hash value for a logical page of data, wherein a hash data size corresponds with the logical page.

9. The storage device of claim 1, wherein the hash generator generates a partial hash from a partial data source.

10. The storage device of claim 1, wherein the hint is one of a single sequence of bytes and a data structure with multiple information and the hint is a unique hash word associated with a data unit.

11. The storage device of claim 1, wherein the hint is a one of a parity polynomial data as a whole and a data structure that is used with additional hints for further accuracy during a search.

12. The storage device of claim 1, further comprises the pattern search engine that is a transceiver in a hardware data path in which a search is performed in real time and the pattern search engine searches the hash channel for the hash data associated with the hint and returns a match list of the hash data that matches the hint to the controller.

13. A method on a storage device for enabling a host to search for data stored across channels on a memory device without reading user data stored on the channels, the storage device comprises a controller to execute the method comprising:

generating hash data including hint data during storage of user data on user channels in a stripe on the memory device;

receiving a hint from the host;

generating a request and submitting the request to a pattern search engine; and sending a hint response including flash translation indices to the host, based on a response from the pattern search engine, wherein the host reads the flash translation indices to request data stored at a specific location in the user channels.

14. The method of claim 13, further comprising triggering a hash generator when the user data is stored on the user channels to generate the hash data and storing the hash data on a hash channel.

15. The method of claim 13, further comprising generating parity information for error correction on the user data and storing the parity information on a parity channel.

16. The method of claim 13, further comprising receiving predefined sized input data and creating a unique hash value for a logical page of data, wherein a hash data size corresponds with the logical page.

17. The method of claim 13, further comprising generating a partial hash from a partial data source.

18. The method of claim 13, further comprising invoking the pattern search engine to perform a search in real time on a hash channel for the hash data associated with the hint and receiving a match list of the hash data that matches the hint from the pattern search engine.

19. A method on a storage device for generating hash data associated with user data stored on user channels to enable a host to search for data stored across channels on a memory device without reading user data stored on the channels, the storage device comprises a controller to execute the method comprising:

receiving data sent from the host to be saved on the user channels on the memory device;

triggering a parity generator to generate parity data for the user data;

triggering a hash generator to generate hash data for the user data;

storing the user data on the user channels, the parity data on a parity channel, and the hash data on a hash channel;

receiving a hint from the host;

searching the hash channel for the hash data that matches the hint; and sending a hint response including flash translation indices to the host, wherein the host reads the flash translation indices to request data stored at a specific location in the user channels.

20. The method of claim 19, further comprising invoking a pattern search engine to perform a search in real time on the hash channel for the hash data associated with the hint and receiving a match list of the hash data that matches the hint from the pattern search engine.

\*    \*    \*    \*    \*